(12) United States Patent
Liang

(10) Patent No.: US 11,166,176 B2
(45) Date of Patent: Nov. 2, 2021

(54) METHOD FOR DETERMINING ESTABLISHMENT REASON, AND TERMINAL

(71) Applicant: China Academy of Telecommunications Technology, Beijing (CN)

(72) Inventor: Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 58 days.

(21) Appl. No.: 16/612,687

(22) PCT Filed: Mar. 29, 2018

(86) PCT No.: PCT/CN2018/081162
§ 371 (c)(1),
(2) Date: Nov. 11, 2019

(87) PCT Pub. No.: WO2018/205765
PCT Pub. Date: Nov. 15, 2018

(65) Prior Publication Data
US 2020/0100123 A1  Mar. 26, 2020

(30) Foreign Application Priority Data
May 11, 2017 (CN) .......................... 201710331386.8

(51) Int. Cl.
*H04W 24/02* (2009.01)
*H04W 76/27* (2018.01)
(Continued)

(52) U.S. Cl.
CPC ........... *H04W 24/02* (2013.01); *H04W 48/02* (2013.01); *H04W 48/16* (2013.01); *H04W 74/0833* (2013.01); *H04W 76/27* (2018.02)

(58) Field of Classification Search
CPC ..... H04W 24/02; H04W 76/27; H04W 48/02; H04W 48/16; H04W 74/0833; H04W 76/10
See application file for complete search history.

(56) References Cited

U.S. PATENT DOCUMENTS

2008/0039083 A1  2/2008  Muniere et al.
2011/0117905 A1  5/2011  Huang et al.
(Continued)

FOREIGN PATENT DOCUMENTS

CN  102300285 A  12/2011
CN  103597901 A  2/2014
(Continued)

OTHER PUBLICATIONS

Ericsson, Access Control for NR [online], 3GPP TSG-Ran WG2 #98 Tdoc R2-1704356, Hangzhou, P.R. of China, May 15-19, 2017, Internet Link: http://www.3gpp.org/ftp/tsg_ran/WG2_RL2/TSGR2_98/Docs/R2-1704356.zip.
(Continued)

*Primary Examiner* — Diane D Mizrahi
(74) *Attorney, Agent, or Firm* — Foley & Lardner LLP

(57) ABSTRACT

The present application relates to the technical field of wireless communications, and in particular to a method for determining an establishment reason, and a terminal, for solving the problem, existing in the prior art, that there is no solution for determining an establishment reason yet under a 5G NR system. In the embodiments of the present application, an RRC layer of a terminal determines an access category of the terminal, and determines, according to a mapping relationship between the access category and a connection establishment reason, a connection establishment reason corresponding to the access category for the terminal. Since a RRC layer of a terminal in the embodiments of the present application determines, according to a (Continued)

mapping relationship between an access category and a connection establishment reason, a connection establishment reason corresponding to the access category for the terminal, a solution for determining an establishment reason under a 5G NR system is provided.

19 Claims, 2 Drawing Sheets

(51) Int. Cl.
    *H04W 48/02*    (2009.01)
    *H04W 48/16*    (2009.01)
    *H04W 74/08*    (2009.01)

(56) References Cited

U.S. PATENT DOCUMENTS

| | | |
|---|---|---|
| 2016/0227468 A1 | 8/2016 | Kim et al. |
| 2016/0338068 A1 | 11/2016 | Cheng et al. |
| 2018/0020382 A1* | 1/2018 | Kim ............... H04W 48/02 |

FOREIGN PATENT DOCUMENTS

| | | |
|---|---|---|
| CN | 105144608 A | 12/2015 |
| CN | 103748811 B | 5/2017 |
| EP | 2 506 632 B1 | 10/2012 |
| JP | 2012-529806 A | 11/2012 |
| JP | 5449542 B2 | 3/2014 |
| WO | WO-2016/184348 A1 | 11/2016 |
| WO | WO-2017/043903 A1 | 3/2017 |

OTHER PUBLICATIONS

LG Electronics: "Discussion on Access Control for 5G System", GPP TSG CT WG1 Meeting #103; C1-171522; Spokane (WA), USA; Apr. 7, 2017.

Access Control for NR, Ericsson,3GPP TSG-Ran WG2 t/97bis Tdoc R2-1702865, Spokane, USA, Apr. 3-7, 2017. pp. 1-5.

Ericsson: "Access Control for NR", 3GPP Draft; R2-1700911 Access Control for NR, 3rd Generation Partnership Project (3GPP), Mobile Competence Centre ; 650, Route Des Lucioles ; F-06921 Sophia-Antipolis Cedex ; FRANCE, vol. Ran WG2, No. Athens, Greece; Feb. 12, 2017, pp. 5.

Intel Corporation: "5G access control mechanism", 3GPP Draft; R2-1704779_NR_Access_Control, 3rd Generation Partnership Project (3GPP), Mobile Competence Centre ; 650, Route Des Lucioles; F-06921 Sophia-Antipolis Cedex ; FRANCE, vol. Ran WG2, No. Hangzhou, China; May 6, 2017, pp. 6.

LG Electronics Inc: "Access control for L TE connected to 5G-CN", 3GPP Draft; R2-1705677 Access Control for LTE Connected to 5G-CN, 3rd Generation Partnership Project (3GPP), Mobile Competence Centre ; 650, Route Des Lucioles ; F-06921 Sophia-Antipolis Cedex ; France, vol. Ran WG2, No. Hangzhou, China; May 6, 2017, pp. 3.

Mediatek Inc: "Unified Access Control", 3GPP Draft; S2-171888 Unified Access Control, 3rd Generation Partnership Project (3GPP), Mobile Competence Centre ; 650, Route Des Lucioles ; F-06921 Sophia-Antipolis Cedex ; France, vol. SA WG2, No. Busan, Korea; Mar. 26, 2017, pp. 5.

\* cited by examiner

METHOD FOR DETERMINING ESTABLISHMENT REASON, AND TERMINAL

This application is a National Stage of International Application No. PCT/CN2018/081162, filed Mar. 29, 2018, which claims priority to Chinese Patent Application No. 201710331386.8, filed May 11, 2017, both of which are hereby incorporated by reference in their entireties.

FIELD

The present application relates to the technical field of wireless communications, and in particular to a method for determining an establishment reason, and a terminal.

BACKGROUND

Long term evolution (LTE) access control mechanisms include an Access Class Barring (ACB) mechanism, a Service Specific Access Control (SSAC) mechanism, an Extended Access Barring (EAB) mechanism and an Application specific Congestion control for Data Communication (ACDC) mechanism.

The ACB mechanism is configured for performing access control on the basis of an access type and an access class of a user equipment (UE). The SSAC mechanism is configured for performing access control on a multimedia telephony voice video call (MMTEL voice/video call) initiated by a terminal. The EAB mechanism is, introduced in view of machine-type communication. The ACDC mechanism is configured for performing access control on operator identified applications.

In an LTE system, in a process of establishing a radio resource control (RRC) connection, reestablishing the RRC connection, and recovering the RRC connection, a first uplink RRC request message initiated by a terminal (also called UE) will carry a connection establishment reason, such as an RRC connection establishment reason (calling, called, high priority level calling, etc.), an RRC connection reestablishment reason (switching failure, reconfiguration failure) and an RRC connection recovery reason (calling, called, etc.). Some connection establishment reasons (such as calling and called) are provided for an RRC layer by a higher layer, and some connection establishment reasons (such as switching failure) are generated by the RRC layer itself.

Along with development of wireless communication systems, terminal types and types of services are diversified, modes and types needing to perform access control are more and more, and access control mechanisms will be complicated.

In the existing LTE system, access control and connection establishment reason generation are two related mechanisms. A unified access control mechanism is introduced into a 5G new radio (NR) system. There is no solution for determining an establishment reason yet under the unified access control mechanism.

In summary, there is no solution for determining an establishment reason yet under the 5G NR system.

SUMMARY

Embodiments of the present application provide a method for determining an establishment reason, and a terminal, for solving the problem, existing in the related art, that there is no solution for determining an establishment reason yet under a 5G NR system.

In a first aspect, the embodiments of the present invention provide a method for determining an establishment reason. The method includes: determining by an RRC layer of a terminal, an access category for the terminal; and determining, by the RRC layer of the terminal, according to a mapping relationship between an access category and a connection establishment reason, a connection establishment reason corresponding to the access category of the terminal.

In a second aspect, the embodiments of the present invention provide a terminal for determining an establishment reason. The terminal includes a category determining module configured to determine an access category of the terminal through a RRC layer; and a processing module configured to determine, according to a mapping relationship between an access category and a connection establishment reason, a connection establishment reason corresponding to the access category of the terminal through the RRC layer.

In a third aspect, the embodiments of the present invention further provide a terminal for determining an establishment reason. The terminal includes a processor, a memory and a transceiver. The processor is configured to read and execute programs in the memory to determine an access category of the terminal through a RRC layer, and determine according to a mapping relationship between an access category and a connection establishment reason, a connection establishment reason corresponding to the access category for the terminal through the RRC layer.

In a fourth aspect, the embodiments of the present invention provide a readable storage medium including program codes, where the program codes are configured for enabling a calculating device to execute a method for determining an establishment reason when the program codes run on the calculating device.

In the embodiments of the present application, a RRC layer of a terminal determines an access category for the terminal, and determines, according to a mapping relationship between an access category and a connection establishment reason, a connection establishment reason corresponding to the access category for the terminal. Since the RRC layer of the terminal in the embodiments of the present application determines, according to the mapping relationship between an access category and a connection establishment reason, the connection establishment reason corresponding to the access category for the terminal, a solution for determining an establishment reason under a 5G NR system is provided.

BRIEF DESCRIPTION OF THE DRAWINGS

In order to more clearly describe solutions of embodiments of the present application, drawings required to be used in descriptions of the embodiments will be briefly introduced below. Obviously, the drawings described below are only some embodiments of the present application, and other drawings can be obtained according to these drawings by those having ordinary skill in the art on the premise of not making inventive labor.

DETAILED DESCRIPTION OF THE EMBODIMENTS

In order to make objects, solutions and advantages of the present application clearer, the present application is further described in details below with reference to drawings. Apparently, embodiments described are only part of embodiments of the present application, rather than all embodiments. All other embodiments achieved by those having ordinary skill in the art on the premise of not making inventive labor on the basis of the embodiments of the present application all fall within the protection scope of the present application.

Figure 1:
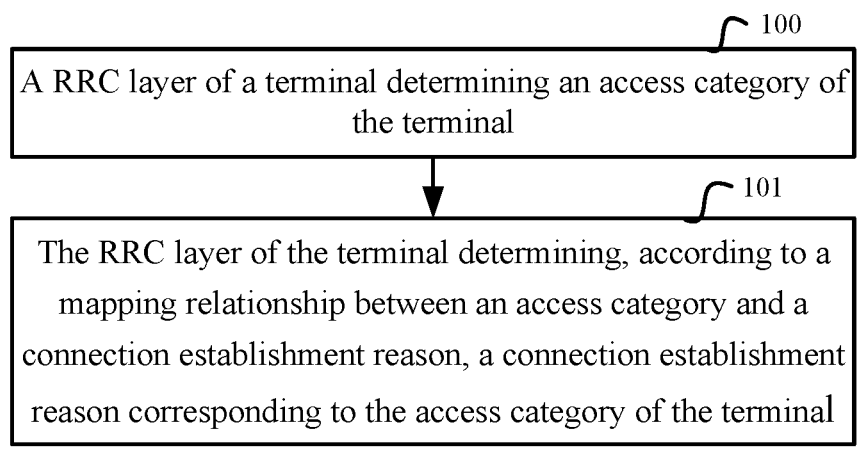
FIG. 1 is a flow schematic diagram of a method for determining an establishment reason of embodiments of the present application.

Referring to FIG. 1, a method for performing access control according to embodiments of the present application includes the following operations.

Operation 100 is that An RRC layer of a terminal determines an access category of the terminal.

Operation 101 is that the RRC layer of the terminal determines, according to a mapping relationship between an access category and a connection establishment reason, a connection establishment reason corresponding to the access category of the terminal.

In the embodiments of the present application, the RRC layer of the terminal determines the access category of the terminal, and determines, according to the mapping relationship between an access category and a connection establishment reason, the connection establishment reason corresponding to the access category for the terminal. Since the RRC layer of the terminal in the embodiments of the present application determines, according to the mapping relationship between an access category and a connection establishment reason, the connection establishment reason corresponding to the access category of the terminal, a solution for determining an establishment reason under a 5G NR system is provided, to thereby improve system performance.

Optionally, there are many modes for the RRC layer of the terminal in the embodiments of the present application to determine the access category of the terminal. For instance a higher layer will notify the RRC layer of the access category if the higher layer of the terminal needs to initiate services. Further for instance the higher layer will notify the RRC layer of the access category by initiating a signaling process, e.g., tracking area update (TAU). correspondingly, the RRC layer of the terminal receives the access category notified by the higher layer.

For example, the RRC layer of the terminal determines the access category by itself, e.g., the RRC layer of the terminal determines the access category during RRC connection recovery of the terminal.

During the RRC connection recovery, the terminal needs to initiate an RAN notification area (RNA) updating process. Since the process is an RAN process and does not relate to a core network, the RRC layer may directly determine the access category as "RNA update".

It shall be noted that the above-mentioned contents are only illustrated, and modes capable of enabling the RRC layer to determine the access category of the terminal are applicable to the embodiments of the present application.

Optionally, the RRC layer of the terminal acquires a mapping relationship between an access category and a connection establishment reason through at least one of specifications in protocols, pre-configuration, or higher-layer notification.

Specifications in protocols, i.e., the mapping relationship is specified through the protocols, for instance the mapping relationship may be specified in the protocols in a form of tables, etc.

Pre-configuration, i.e., the mapping relationship is configured into the terminal in advance.

Higher-layer notification, i.e., the higher layer notifies the terminal of the mapping relationship.

In implementations, due to various reasons (for example, services are newly added, and new access categories and establishment reasons are required to be added; and the existing access categories are adjusted (for example, some services are deleted, the access categories and establishment reasons are reallocated, etc.)), mapping relationships between access categories and connection establishment reasons may be changed, thus, the RRC layer needs to update the mapping relationships between the access categories and the connection establishment reasons. The process of updating includes but not limited to modifying, deleting and adding.

Optionally, the RRC layer of the terminal updates the mapping relationships between the access categories and the connection establishment reasons according to an updating notification received from the higher layer.

Besides the mode of notifying updating by the higher layer, the RRC layer may perform updating automatically if the RRC layer discovers that the mapping relationships between the access categories and the connection establishment reasons are changed.

After the RRC layer of the terminal determines the connection establishment reason corresponding to the access category for the terminal, the RRC layer of the terminal may perform an access control judgment operation according to the access category of the terminal and/or the determined connection establishment reason.

Detailed introduction is performed below.

1. In implementations, if the mapping relationship between an access category and a connection establishment reason is of a one-to-one mapping relationship, the access control judgment operation is performed according to the access category of the terminal.

For example, the access category is category 6, and an access strategy of the category 6 broadcast at a network side is 1 bit. UE may initiate services of the category 6 when the 1 bit refers to TRUE; when the 1 bit refers to FALSE, the services of the category 6 cannot be initiated.

2. In implementations, if the mapping relationship between access categories and connection establishment reasons is of a many-to-one mapping relationship, the access control judgment operation is performed according to the determined connection establishment reason.

For example, the connection establishment reason is a calling service, and an access strategy of the calling service broadcast at a network side is 1 bit. UE may initiate the calling service when the 1 bit refers to TRUE; when the 1 bit refers to FALSE, the calling service cannot be initiated.

3. In implementations, if the mapping relationship between access categories and connection establishment reasons is of a many-to-one mapping relationship, and access strategies of different access categories are different in the same connection establishment reason, the access control judgment operation will be performed according to the access category of the terminal and the determined connection establishment reason.

For example, the connection establishment reason is calling, and calling broadcast at a network side includes two kinds of access strategies, i.e., a calling service and calling signaling. Each strategy is 1 bit. UE may initiate the calling service when the 1 bit of the calling service refers to TRUE, and the UE may not initiate the calling service when the 1 bit of the calling service refers to FALSE; and UE may initiate the calling signaling when the 1 bit of the calling signaling refers to TRUE, and UE may not initiate the calling signaling when the 1 bit of the calling signaling refers to FALSE. For example, the calling signaling can be initiated, and the calling service cannot be initiated.

Optionally, the RRC layer of the terminal sends an uplink RRC message containing the connection establishment reason if the RRC layer of the terminal determines that the terminal is able to access.

The operation of sending the uplink RRC message containing the connection establishment reason is used for judging by the network side whether UE with the establishment reason is allowed to be accommodated or not.

Solutions of the present application are described in details below by citing several embodiments.

Embodiment 1: RRC Connection Establishment Process (Protocol Pre-Specified, or Pre-Configured Mode)

In view of the RRC connection establishment process, a RRC layer of a terminal maintains mapping relationships between access categories and connection establishment reasons.

The mapping relationships may be set as required. Referring to table 1, a mapping relationship is provided according to embodiments of the present application. It shall be noted that the mapping relationship provided in table 1 is illustrated, and any mapping relationship between the access categories and the connection establishment reasons is applicable to the embodiments of the present application.

TABLE 1

| Access category | Cause value (specific suggested cause) |
| --- | --- |
| 1 | High priority level |
| 2 | High priority level |
| 3 | High priority level |
| 4 | High priority level |
| 5 | High priority level |
| 6 | Emergency call |
| 7 | Calling service |
| 8 | Calling signaling |
| 9 | Called |
| 10 | Low-delay-requirement service |
| 11 | Low-delay-requirement service |
| 12 | Low-delay-requirement service |
| 13 | Voice |
| 14 | Video |
| 15 | SMS message |
| 16 | Application layer service category 1 |
| 17 | Application layer service category 2 |
| ... | ... |
| 31 | Application layer service category 16 |

In implementations, a terminal may acquire the mapping relationship according to at least one of the following modes: protocol pre-specified, for example performing pre-engagement in a higher-layer protocol; or pre-configured, for example performing pre-configuring in a RRC layer.

The mapping relationship may have a basic default configuration. When a change occurs, the terminal may do corresponding updating, for example the RRC layer performs updating after a higher layer notification is received; and updating may also be performed after the RRC layer determines that the mapping relationship is changed.

When a higher layer needs to initiate a service, the higher layer firstly provides information on an access category (category 7 for instance) for the RRC layer.

The RRC layer seeks a mapping relationship between an access category and a connection establishment reason according to the information on the access category and generates a corresponding establishment reason, namely calling service, according to the mapping relationship.

The RRC layer performs an access control judgment flow according to the access category (category 7) and/or the establishment reason (calling service). When the condition that UE may access is judged, an access process is triggered, and an uplink RRC message carries the establishment reason, i.e. "calling service".

Embodiment 2: RRC Connection Establishment Process (a Mode for Supplying a Mapping Relationship to a RRC Layer by a Higher Layer)

After UE is started up or a mapping relationship between an access category and a connection establishment reason is updated, a higher layer of the UE provides the mapping relationship between an access category and a connection establishment reason to the RRC layer, and a form can be the same as table 1 in the embodiment 1.

When the higher layer needs to initiate a service subsequently, the higher layer firstly provides information on an access category (category 5 for instance) for the RRC layer.

The RRC layer seeks a mapping relationship between an access category and a connection establishment reason according to the information on the access category and generates a corresponding establishment reason, namely high priority level, according to the mapping relationship.

The RRC layer performs an access control judgment flow according to the access category (category 5) and/or the establishment reason (high priority level). When the condition that the UE may access is judged, a first uplink RRC message carries the establishment reason, i.e., "high priority level".

Embodiment 3: RRC Connection Recovery Process

In view of the RRC connection recovery process, a RRC layer maintains mapping relationships between access categories and connection establishment reasons, and the mapping relationships may be the same as table 1 in the embodiment 1.

Difference from the embodiment 1 lies in that related access category information is generated by the RRC layer during the RRC connection recovery process.

Then, the RRC layer seeks a mapping relationship between an access category and a connection establishment reason according to the generated information on the access category (category 9 for instance) and generates a corresponding establishment reason, namely called, according to the mapping relationship. The RRC layer performs an access control judgment flow according to the access category (category 9) and/or the establishment reason (called). When the condition that the UE may access is judged, a first uplink RRC message carries the establishment reason, i.e., "called".

Based on the same inventive concept, the embodiments of the present application further provide a terminal. Since a principle for solving problem by the terminal is similar to that of a method for determining an establishment reason according to the embodiments of the present invention, therefore, implementations of the terminal may refer to those of the method, and no further description is needed in details.

Figure 2:
FIG. 2 is a structural schematic diagram of a first terminal of embodiments of the present application.

Referring to FIG. 2, a first terminal of the embodiments of the present invention includes a category determining module 200 and a processing module 201.

The category determining module 200 is configured to determine an access category for the terminal through a RRC layer.

The processing module 201 is configured to determine, according to a mapping relationship between an access category and a connection establishment reason, a connection establishment reason corresponding to the access category for the terminal through the RRC layer.

Optionally, there are many modes for the RRC layer of the terminal in the embodiments of the present application to determine the access category for the terminal.

For instance the category determining module 200 is further configured to receive the access category notified by a higher layer through the RRC layer; or determine the access category through the RRC layer itself. For example the RRC layer of the terminal determines the access category during RRC connection recovery of the terminal.

It shall be noted that the above-mentioned contents are illustrated, and modes capable of enabling the RRC layer to determine the access category for the terminal are applicable to the embodiments of the present application.

Optionally, the processing module 201 is further configured to acquire a mapping relationship between an access category and a connection establishment reason through at least one of specifications in protocols, pre-configuration, or higher-layer notification.

Specifications in protocols, i.e., the mapping relationship is specified through the protocols, for instance the mapping relationship may be specified in the protocols in a form of tables, etc.

Pre-configuration, i.e., the mapping relationship is configured into the terminal in advance.

Higher-layer notification, i.e., the higher layer notifies the terminal of the mapping relationship.

In implementations, due to various reasons (for example, services are newly added, and new access categories and establishment reasons are required to be added; and the existing access categories are adjusted (for example, some services are deleted, the access categories and establishment reasons are reallocated, etc.)), mapping relationships between access categories and connection establishment reasons may be changed, thus, the RRC layer needs to update the mapping relationships between the access categories and the connection establishment reasons. The process of updating includes but not limited to modifying, deleting and adding.

Optionally, the processing module 201 is further configured to update the mapping relationship between an access category and a connection establishment reason according to an updating notification received from the higher layer through the RRC layer.

Besides the mode of notifying updating by the higher layer, the RRC layer may perform updating automatically if the processing module 201 discovers that the mapping relationships between the access categories and the connection establishment reasons are changed through the RRC layer.

Optionally, the processing module 201 is further configured to perform an access control judgment operation according to the access category of the terminal and/or the determined connection establishment reason through the RRC layer.

Optionally, the processing module 201 is further configured to send an uplink RRC message containing the connection establishment reason through the RRC layer after determining that the terminal is able to access.

Figure 3:
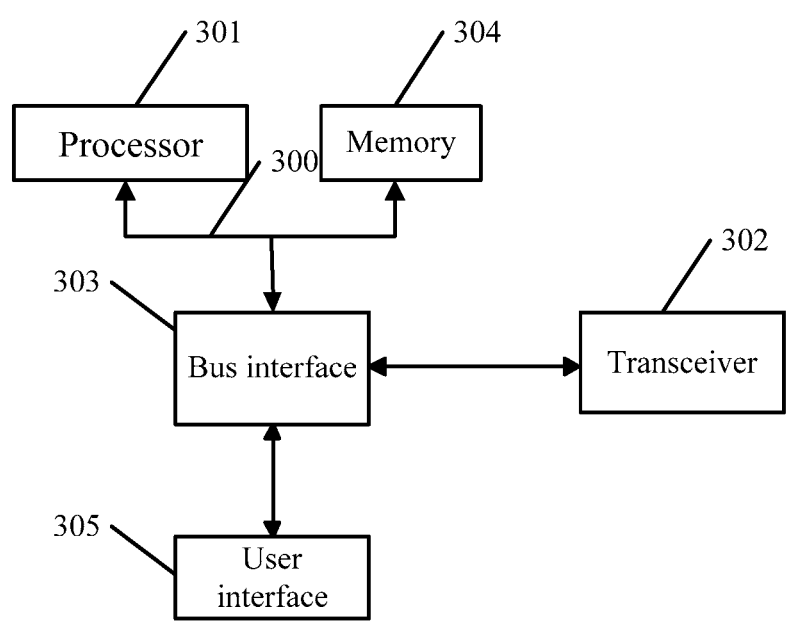
FIG. 3 is a structural schematic diagram of a second terminal of embodiments of the present application.

Referring to FIG. 3, a second terminal according to the embodiments of the present invention is provided. The second terminal includes a processor 301, a memory 304 and a transceiver 302.

The processor 301 is configured to read and execute programs in the memory 304 to determine an access category of the terminal through a RRC layer, and to determine, according to a mapping relationship between an access category and a connection establishment reason, a connection establishment reason corresponding to the access category of the terminal through the RRC layer.

The transceiver 302 is configured to receive and send data under the control of the processor 301.

Optionally, the processor 301 is further configured to receive the access category notified by a higher layer through the RRC layer; or determine the access category by the RRC layer itself.

Optionally, the processor 301 is further configured to acquire the mapping relationship between an access category and a connection establishment reason according to at least one of specifications in protocols; pre-configuration; or higher-layer notification.

Optionally, the processor 301 is configured to update the mapping relationship between an access category and a connection establishment reason according to an updating notification received from a higher layer through the RRC layer.

Optionally, the processor 301 is further configured to perform an access control judgment operation according to the access category of the terminal and/or the determined connection establishment reason through the RRC layer.

Optionally, the processor 301 is further configured to send an uplink RRC message containing the connection establishment reason through the RRC layer after determining that the terminal is able to access.

In which, interaction between the processor 301 and the terminal is performed through the transceiver 302.

FIG. 3 illustrates a bus structure (represented by a bus 300). The bus 300 may include random quantities of interconnected buses and bridges. Various circuits including one or more processors represented by a general processor 301 and memories represented by a memory 304 are linked together by the bus 300. All kinds of other circuits such as peripheral terminals, voltage regulators and power management circuits may also be linked together by the bus 300 is known in the field, so that no further description is needed in the text. A bus interface 303 provides an interface between the bus 300 and the transceiver 302.

The transceiver 302 may be an element, may also be a plurality of elements, for instance a plurality of receivers and transmitters, and provides a unit for being in communication with other devices on a transmission medium. For example: the transceiver 302 receives external data from other terminals. The transceiver 302 is configured for sending data processed by the processor 301 to other terminals. Decided by properties of a computing system, user interfaces 305 such as a keypad, a display, a loudspeaker, a microphone and an operating lever can be further provided.

The processor 301 is responsible for managing the bus 300 and general processing such as the fore-mentioned running general operating system. The memory 304 can be used for storing data employed by the processor 301 during operation executing.

Optionally, the processor 301 may be a Central Processing Unit (CPU), an Application Specific Integrated Circuit (ASIC), a Field-Programmable Gate Array (FPGA) or a Complex Programmable Logic Device (CPLD).

Embodiments of the present application further protect a readable storage medium, and the storage medium stores a program for executing a method for determining an establishment reason referring to a FIG. 1 of the embodiments of the present application. After the storage is connected with other terminals, the program in the storage medium can be executed through a calculating device in the other terminals, and thus, solutions of the embodiments of the present application are achieved.

The storage can be connected with the other terminals through external interfaces or internal interfaces. For example, the storage is a USB drive, a mobile HDD, etc., and thus, the storage can be connected through an external interface; and for example, the storage is a storage module in the other terminals, and thus, the storage can be connected through an internal interface.

The present application is described referring to methods, devices (systems) and/or block diagrams and/or flow charts of computer programmed products according to embodiments of the present application shown above. It should be understood that a block of a pictorial view of the block diagram and/or flow chart and combination of blocks of the pictorial view of the block diagram and/or flow chart can be achieved through computer programmed instructions. These computer programmed instructions can be supplied to a general-purpose computer, a processor of a special-purpose computer and/or other programmable data processing devices to generate a machine, so that instructions executed by the computer processor and/or the other programmable data processing devices create a method for achieving appointed functions/actions in blocks of a block diagram and/or a flow chart.

Correspondingly, the present application can also be implemented with hardware and/or software (including firmware, resident software, microcode, etc.). More further, the present application may adopt a form of computer programmed products on computer usable or computer readable storage media, and the computer programmed products have computer usable or computer readable program codes achieved in the media and are used by an instruction execution system or in a manner of combining the instruction execution system. In the context of the present application, the computer usable or computer readable media may be any medium, may contain, store, communicate, transmit or convey programs, are used by instruction execution systems, devices or terminals or are used in a manner of combining the instruction execution systems, devices or terminals.

Apparently, various changes and modifications can be made to the present application by those skilled in the art without departing from the spirit and scope of the present application. Thus, provided that these changes and modifications of the present application belong to scopes of the claims of the present application and equivalent technologies thereof, the present application also intends to include these changes and modifications.

The invention claimed is:

1. A method for determining an establishment reason, comprising:
   determining, by a Radio Resource Control (RRC) layer of a terminal, an access category of the terminal; and
   determining, by the RRC layer of the terminal, a connection establishment reason corresponding to the access category of the terminal, according to a mapping relationship between an access category and a connection establishment reason.

2. The method according to claim 1, wherein the determining, by the RRC layer of the terminal, the access category of the terminal comprises:
   receiving, by the RRC layer of the terminal, the access category notified by a higher layer; or
   determining, by the RRC layer of the terminal, the access category by the RRC layer itself.

3. The method according to claim 2, wherein after determining, by the RRC layer of the terminal, the connection establishment reason corresponding to the access category of the terminal, the method further comprises:
   performing, by the RRC layer of the terminal, an access control judgment operation according to the access category of the terminal and/or the determined connection establishment reason.

4. The method according to claim 1, wherein the RRC layer of the terminal acquires the mapping relationship between an access category and a connection establishment reason according to at least one of:
   specifications in protocols;
   pre-configuration; or
   higher-layer notification.

5. The method according to claim 4, wherein after determining, by the RRC layer of the terminal, the connection establishment reason corresponding to the access category of the terminal, the method further comprises:
   performing, by the RRC layer of the terminal, an access control judgment operation according to the access category of the terminal and/or the determined connection establishment reason.

6. The method according to claim 1, wherein the method further comprises:
   updating, by the RRC layer of the terminal, the mapping relationship between an access category and a connection establishment reason according to an updating notification received from a higher layer.

7. The method according to claim 6, wherein after determining, by the RRC layer of the terminal, the connection establishment reason corresponding to the access category of the terminal, the method further comprises:
   performing, by the RRC layer of the terminal, an access control judgment operation according to the access category of the terminal and/or the determined connection establishment reason.

8. The method according to claim 1, wherein after determining, by the RRC layer of the terminal, the connection establishment reason corresponding to the access category of the terminal, the method further comprises:
   performing, by the RRC layer of the terminal, an access control judgment operation according to the access category of the terminal and/or the determined connection establishment reason.

9. The method according to claim 8, wherein after performing, by the RRC layer of the terminal, the access control judgment operation according to the access category of the terminal and/or the determined connection establishment reason, the method further comprises:
   sending, by the RRC layer of the terminal, an uplink RRC message containing the connection establishment reason after determining that the terminal is able to access.

10. A terminal for determining an establishment reason, comprising: a processor, a memory and a transceiver, wherein the processor is configured to read and execute programs in the memory to:
  determine an access category of the terminal through a Radio Resource Control (RRC) layer; and
  determine a connection establishment reason corresponding to the access category of the terminal through the RRC layer, according to a mapping relationship between an access category and a connection establishment reason.

11. The terminal according to claim 10, wherein the processor is further configured to:
  receive the access category notified by a higher layer through the RRC layer; or
  determine the access category by the RRC layer itself.

12. The terminal according to claim 11, wherein the processor is further configured to:
  perform an access control judgment operation according to the access category for the terminal and/or the determined connection establishment reason through the RRC layer.

13. The terminal according to claim 10, wherein the processor is further configured to acquire the mapping relationship between an access category and a connection establishment reason according to at least one of:
  specifications in protocols;
  pre-configuration; or
  higher-layer notification.

14. The terminal according to claim 13, wherein the processor is further configured to:
  perform an access control judgment operation according to the access category for the terminal and/or the determined connection establishment reason through the RRC layer.

15. The terminal according to claim 10, wherein the processor is further configured to:
  update the mapping relationship between an access category and a connection establishment reason according to an updating notification received from a higher layer through the RRC layer.

16. The terminal according to claim 15, wherein the processor is further configured to:
  perform an access control judgment operation according to the access category for the terminal and/or the determined connection establishment reason through the RRC layer.

17. The terminal according to claim 10, wherein the processor is further configured to:
  perform an access control judgment operation according to the access category for the terminal and/or the determined connection establishment reason through the RRC layer.

18. The terminal according to claim 17, wherein the processor is further configured to:
  send an uplink RRC message containing the connection establishment reason through the RRC layer after determining that the terminal is able to access.

19. A non-transitory readable storage medium, comprising program codes, wherein the program codes are configured for enabling a calculating device to execute the method according to claim 1 when the program codes run on the calculating device.

* * * * *